US009180663B2

(12) United States Patent
Kido (10) Patent No.: US 9,180,663 B2
(45) Date of Patent: Nov. 10, 2015

(54) IMAGE PROCESSING APPARATUS, IMAGE PROCESSING SYSTEM, AND IMAGE PROCESSING METHOD

(71) Applicant: CANON KABUSHIKI KAISHA, Tokyo (JP)

(72) Inventor: Hideyuki Kido, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/202,502

(22) Filed: Mar. 10, 2014

(65) Prior Publication Data

US 2014/0192107 A1 Jul. 10, 2014

Related U.S. Application Data

(63) Continuation of application No. 12/825,188, filed on Jun. 28, 2010, now Pat. No. 8,711,438.

(30) Foreign Application Priority Data

Jul. 1, 2009 (JP) .................................. 2009-157027

(51) Int. Cl.
*H04N 1/00* (2006.01)
*B41J 2/07* (2006.01)
*H04N 1/047* (2006.01)
*H04N 1/12* (2006.01)
*H04N 1/191* (2006.01)

(52) U.S. Cl.
CPC . *B41J 2/07* (2013.01); *H04N 1/047* (2013.01); *H04N 1/12* (2013.01); *H04N 1/1911* (2013.01); *H04N 2201/0094* (2013.01); *H04N 2201/04717* (2013.01); *H04N 2201/04787* (2013.01)

(58) Field of Classification Search
None
See application file for complete search history.

(56) References Cited

U.S. PATENT DOCUMENTS

| 2003/0161058 A1* | 8/2003 | Azumai | 359/896 |
|---|---|---|---|
| 2006/0269342 A1* | 11/2006 | Yoshida et al. | 400/62 |
| 2007/0069400 A1* | 3/2007 | Tanaka | 257/797 |
| 2009/0238464 A1* | 9/2009 | Ohira | 382/190 |

* cited by examiner

*Primary Examiner* — Helen Q Zong
(74) *Attorney, Agent, or Firm* — Canon U.S.A., Inc. IP Division (57) ABSTRACT

An image processing apparatus includes a recording control unit for recording, by a recording head, a recording position adjustment chart including a pattern for adjusting a recording position of the recording head discharging ink and a mark formed in a position different from that of the pattern, a reading unit for reading the recording position adjustment chart as image data, a first detection unit for detecting a position and inclination of the recording position adjustment chart when reading the recording position adjustment chart based on the mark, a second detection unit for detecting the position of the pattern based on the position and the inclination detected by the first detection unit, and a determination unit for determining adjustment values for the recording position adjustment based on the image data of the recording position adjustment chart in which the position of the pattern has been detected by the second detection unit.

14 Claims, 11 Drawing Sheets

|  | DX | DY | SW | SH |
|---|---|---|---|---|
| PA1 | 10 | 10 | 10 | 5 |
| PA2 | 10 | 20 | 10 | 5 |
| PA3 | 10 | 30 | 10 | 5 |
| PA4 | 10 | 40 | 10 | 5 |
| PA5 | 10 | 50 | 10 | 5 |
| PB1 | 20 | 10 | 15 | 5 |
| PB1 | 20 | 20 | 15 | 5 |

IMAGE PROCESSING APPARATUS, IMAGE PROCESSING SYSTEM, AND IMAGE PROCESSING METHOD

CROSS-REFERENCE TO RELATED APPLICATIONS

This application is a Continuation of U.S. patent application Ser. No. 12/825,188, filed Jun. 28, 2010, which claims the benefit of Japanese Application No. 2009-157027, filed Jul. 1, 2009, both of which are hereby incorporated by reference herein in their entirety.

BACKGROUND OF THE INVENTION

1. Field of the Invention

The present invention relates to an image processing apparatus, an image processing system, and an image processing method for adjusting a recording position of a recording head which discharges ink.

2. Description of the Related Art

In a conventional inkjet recording apparatus, a recording positional deviation occurs depending on accuracy of a manufacturing process of a printing head (recording head) or mounting accuracy of the printing head. For example, a printing positional deviation may occur between a monochrome ink discharge port chip and a color ink discharge port chip, between ink discharge port arrays, between forward printing and backward printing, or between paths during multipass printing.

In order to solve such a recording positional deviation, for example, a plurality of patterns is printed while shifting a printing position under a print condition corresponding to an adjustment item to output a chart. The output chart is read by a scanner, and a pattern position in image data is detected. Luminance of a pattern in a pattern array corresponding to the adjustment item is measured based on the detected pattern position. It is determined that a pattern with the lowest luminance among the luminance of the measured patterns is a pattern of an optimal recording position, and an adjustment value is determined based on a shifting amount of the pattern. Accordingly, printing position adjustment can be realized.

Thus, processing for adjusting the printing position based on the pattern luminance in the image data necessitates pattern position detection. However, in processing for the pattern position detection, there occurs a problem that the pattern position may deviate in the image data due to a deviation of a chart installing position in a reading apparatus, optical distortion of the reading apparatus, or accuracy of a manufacturing process of the reading apparatus.

Under such circumstances, various methods have been discussed to accurately detect a position of a predetermined pattern or object from image data. For example, Japanese Patent Application Laid-Open No. 11-340115 discusses a technique which extracts a predetermined feature amount from a detected image, generates an abstract pattern of the detected image based on the feature amount, and extracts a feature amount using a reference image. An abstract pattern of the reference image is generated based on the feature amount, and a pattern position of the reference image is detected in the image data by matching the abstract patterns with each other.

However, the above described conventional technique has the following problems. For example, in the technique discussed in Japanese Patent Application Laid-Open No. 11-340115, processing is performed to obtain feature amounts such as a density of graphics, a center of gravity, a principal axis of inertia, and moment of the principal axis of inertia from the detected image. Abstract patterns in which the feature amounts are disposed based on the detected image and the reference image are created. The positions of the patterns are detected by matching the created abstract patterns with each other. However, calculation time is necessary for creating the abstract patterns based on the two images, i.e., the detected image and the reference image, so that processing time for pattern position detection may be increased.

SUMMARY OF THE INVENTION

According to an aspect of the present invention, an image processing apparatus includes a recording control unit configured to record, by a recording head, a recording position adjustment chart including a pattern for adjusting a recording position of the recording head which discharges ink and a mark formed in a position different from a position of the pattern, a reading unit configured to read the recording position adjustment chart as image data, a first detection unit configured to detect a position and inclination of the recording position adjustment chart when the recording position adjustment chart is read based on the mark, a second detection unit configured to detect the position of the pattern based on the position and the inclination detected by the first detection unit, and a determination unit configured to determine an adjustment value for the recording position adjustment based on the image data of the recording position adjustment chart in which the position of the pattern has been detected by the second detection unit.

According to another aspect of the present invention, a computer-readable storage medium storing a program for causing a computer to execute a method for processing an image. The method includes recording, on a recording medium, a recording position adjustment chart including a pattern for adjusting a recording position of a recording head which discharges ink and a mark formed in a position different from a position of the pattern, reading the recording position adjustment chart as image data, detecting a position and inclination of the recording position adjustment chart when the recording position adjustment chart is read based on the mark, detecting the position of the pattern based on the position and the inclination detected by a first detection unit, and determining an adjustment value for the recording position adjustment based on the image data of the recording position adjustment chart in which the position of the pattern has been detected.

According to yet another aspect of the present invention, a method for processing an image includes recording, on a recording medium, a recording position adjustment chart including a pattern for adjusting a recording position of a recording head which discharges ink and a mark formed in a position different from a position of the pattern, reading the recording position adjustment chart as image data, detecting a position and inclination of the recording position adjustment chart when the recording position adjustment chart is read based on the mark, detecting the position of the pattern based on the position and the inclination detected by a first detection unit, and determining an adjustment value for the recording position adjustment based on the image data of the recording position adjustment chart in which the position of the pattern has been detected.

According to the present invention, concerning pattern position detection of image data, highly accurate pattern position detection can be performed within a short calculation time without creating an abstract pattern by obtaining feature amounts of an image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 10A:
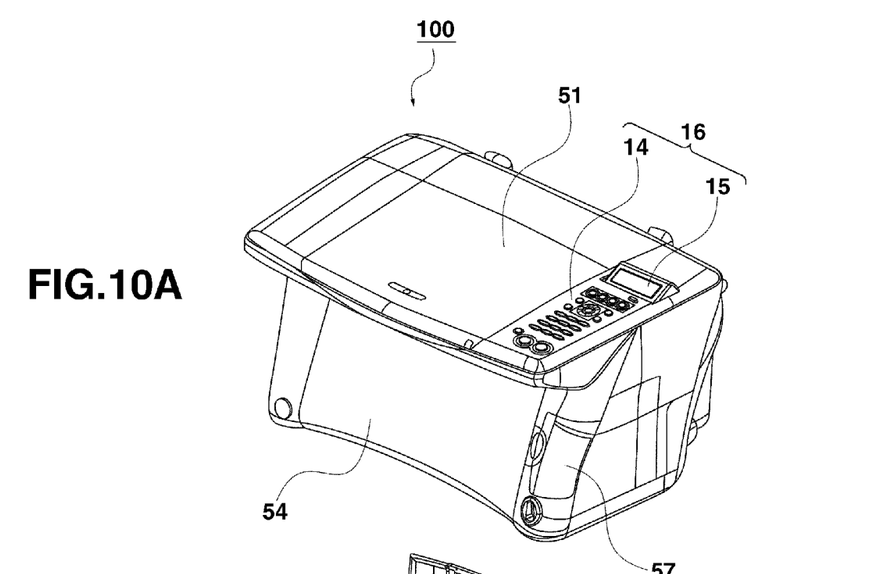
FIGS. 10A and 10B are appearance perspective views of a recording apparatus according to the first exemplary embodiment.
Figure 10B:
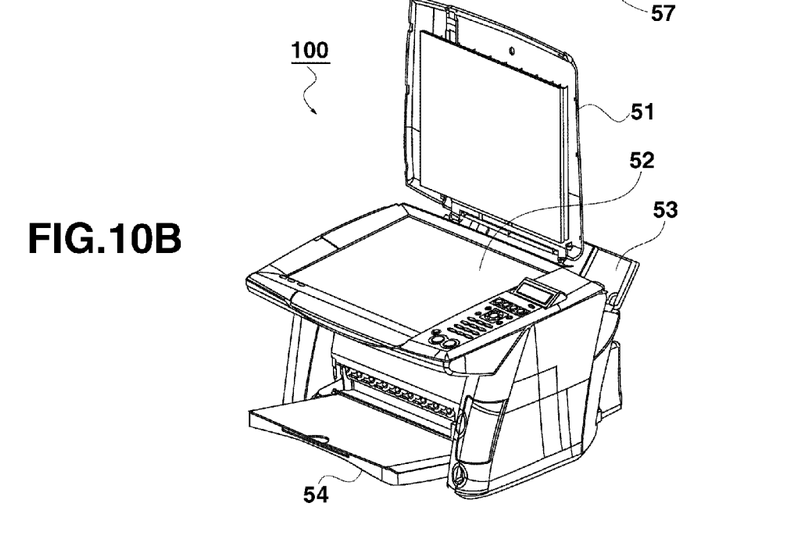

First, a multifunction recording apparatus (hereinafter, referred to as a multifunctional peripheral (MFP)) to which the present invention can be applied will be described. FIGS. 10A and 10B are appearance perspective views of an MFP 100.

The MFP 100 has a printer function, a scanner function, and an external memory reading function. A printer unit (image recording unit) for realizing the printer function includes an inkjet recording apparatus. A scanner unit (reading unit) for realizing the scanner function includes an optical scanner.

FIG. 10A illustrates a state where a document cover 51 of the scanner unit and a sheet discharge tray 54 of the printer unit are closed. FIG. 10B illustrates a state where the document cover 51 is opened, so that a platen 52 for placing an image document. FIG. 10B also illustrates a state where an automatic sheet feeder (ASF) 53 for placing recording paper and the sheet discharge tray 54 are opened. The scanner unit includes a charge coupled device (CCD), and reads a document image from the CCD to output analog luminance signals of red (R), green (G), and blue (B). The scanner unit may use a contact image sensor (CIS) in place of the CCD.

In FIGS. 10A and 10B, on a right upper portion of the MFP 100, an operation panel 16 which includes an operation unit 14 having a plurality of keys and buttons and a display unit (liquid crystal display (LCD)) 15. In the center of a right side surface of the MFP 100, a card interface 57 is provided. For example, a memory card storing an image file captured by a digital still camera and recorded can be inserted into the card interface 57. The image file stored in the memory card is read to the MFP 100 by a user performing a predetermined operation from the operation unit 14, and the image can be recorded by the printer unit.

Figure 11:
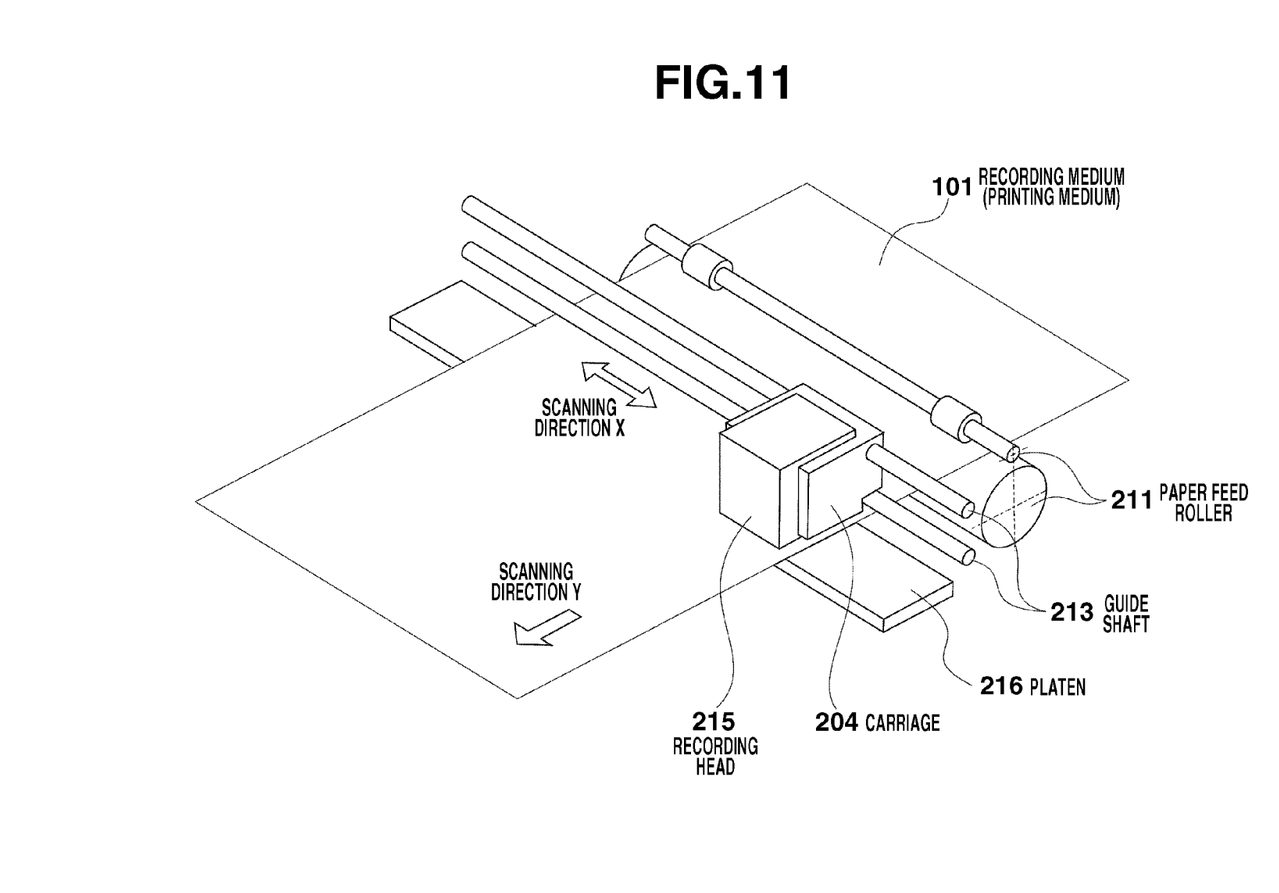
FIG. 11 illustrates a configuration of a recording unit according to the first exemplary embodiment.

FIG. 11 is a perspective view illustrating a configuration of the printer unit (inkjet recording apparatus) of the MFP 100 illustrated in FIGS. 10A and 10B. A paper feed roller pair 211 rotates while holding a recording medium (print medium) 101 between two rollers to convey the recording medium in a sub-scanning direction. A platen 216 supports an area in which recording is performed on the conveyed recording medium 101 from below, and maintains an interval between the recording medium 101 and a discharge port surface of a recording head 215 at an appropriate value.

The recording head 215 is detachably mounted to a carriage 214 which moves along a guide shaft 213, and moves in a main scanning direction while discharging ink droplets from a plurality of discharge ports (or nozzles) based on a recording signal. Accordingly, recording of one recording scanning amount is performed on the recording medium 101. When one batch of a recording scanning operation is performed, the recording medium 101 is conveyed in the subscanning direction by an amount corresponding to a recording width of the recording head 215. Images are sequentially formed on the recording medium 101 by alternately repeating such a recording scanning operation and conveyance operation.

The recording head 215 includes two chips, i.e., a monochrome chip and a color chip, on its discharge port surface. The monochrome chip includes a black nozzle array for discharging black ink. The color chip includes three nozzle arrays for discharging cyan, magenta, and yellow inks which are disposed in the main scanning direction.

Ink discharged from the recording head 215 is supplied from an ink supply device (not illustrated) fixed in the inkjet recording apparatus. The inkjet recording apparatus includes, though not illustrated, a recording medium supply unit for supplying the recording medium 101 before recording to the paper feed roller 211, and a recording medium discharge unit for discharging the recording medium after recording. In order to stably obtain effects of the present invention, the inkjet recording apparatus can include a recovery unit for performing maintenance processing of the recording head 215, and a spare auxiliary unit. As such units, there can be cited a capping unit for capping the discharge port surface of the recording head, a cleaning unit for wiping out foreign objects from the discharge port surface, a unit for pressurizing or sucking the inside of the discharge port, and a unit for receiving discharged spare ink.

Figure 1:
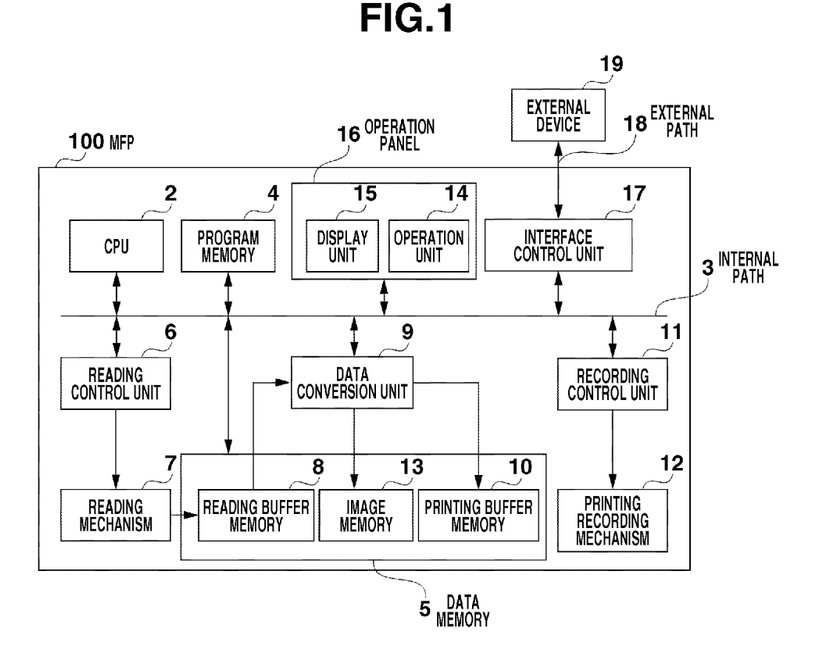
FIG. 1 is a block diagram illustrating a configuration of an image processing apparatus according to a first exemplary embodiment.

FIG. 1 is a block diagram of the MFP 100. A central processing unit (CPU) 2 of a microprocessor type operates based on a control program stored in a program memory 4 connected via an internal bus 3 and contents of a data memory 5 of a random access memory (RAM) type. A printing recording mechanism 12 is a printer unit which includes an inkjet type printer. The CPU 2 operates, via a recording control unit 11, the printing recording mechanism 12, reads printing recording data stored in a printing buffer memory 10, transmits the data to the printing recording mechanism 12, and prints and records the data on the recording medium, thereby realizing a printing operation. A reading mechanism 7 is a scanner unit based on a CCD system for reading a photograph or a magazine as image data.

The CPU 2 operates, via a reading control unit 6, the reading mechanism 7, and stores image data read by an image sensor (not illustrated) disposed in the reading mechanism 7 in a reading buffer memory 8 of the data memory 5, thereby realizing a reading operation. The image data stored in the reading buffer memory 8 is read by a data conversion unit 9, converted into printing recording data, and then stored in the printing buffer memory 10 in the data memory 5. The CPU 2 operates, via the recording control unit 11, the printing recording mechanism 12, reads the printing recording data stored in the printing buffer memory 10, transmits the data to the printing recording mechanism 12, and prints and records the data on the recording medium, thereby realizing a copying operation.

The data memory 5 includes an image memory 13 which temporarily stores various pieces of image data in addition to the image data read by the reading mechanism 7 to enable editing the image data. The image data stored in the image memory 13 is read and converted into the printing recording data by the data conversion unit 9, and subjected to a printing recording operation, so that a photographic image and others can be printed in addition to a copying operation. The reading buffer memory 8, the printing buffer memory 10, and the image memory 13 on the data memory 5 can be operated, under control of the CPU 2, by dynamically changing capacity distribution of the memories and allocating capacities based on an operation status such as an operation mode or user setting. The data conversion unit 9 performs image processing such as image analysis, thumbnail creation, thumbnail correction, and output image correction. The CPU 2 can realize image processing of printing position adjustment described below and others by executing image processing for the image data stored in the data memory 5.

The MFP 100 includes the operation panel 16 including the display unit 15 such as a light emitting diode (LED) or a liquid crystal display (LCD) and the operation unit 14 including various keys. The operation panel 16 enables an operator to execute various input operations or display of an operation status. An interface control unit 17 controls communication performed via an external bus 18, and transmits and receives data to and from an external device 19 connected to the outside. A personal computer can be connected as the external device 19. The personal computer receives printing recording data generated by a printer driver running on the computer, and prints and records the data. The personal computer is connected as the external device 19. The personal computer receives a reading request from a scanner driver running on the computer, transmits the image data stored in the reading buffer memory 8, and reads a document.

Figure 2:
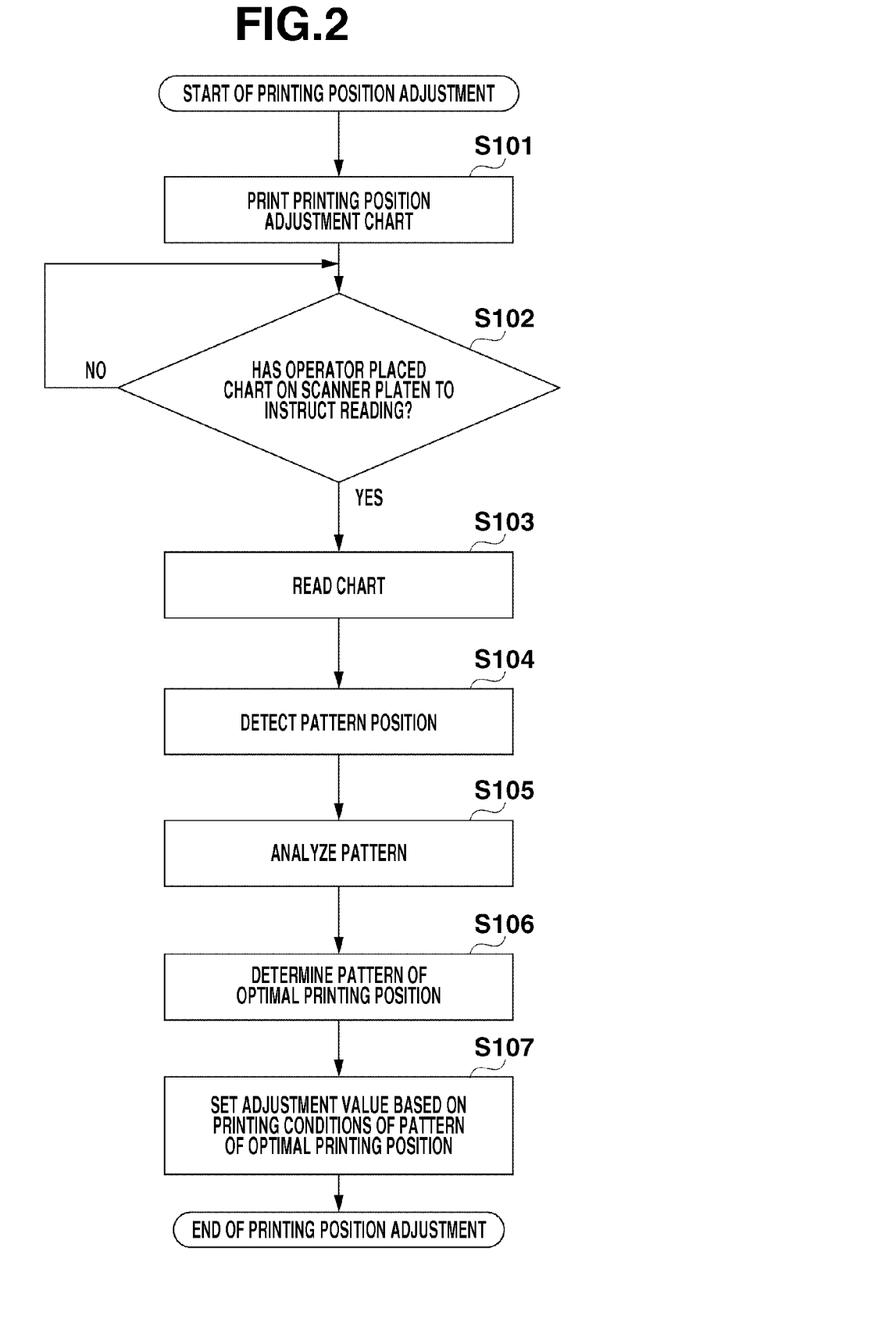
FIG. 2 is a flowchart illustrating a procedure of printing position adjustment according to the first exemplary embodiment.

FIG. 2 is a flowchart illustrating a procedure of printing position adjustment in the MFP 100 according to the present exemplary embodiment. In step S101, the operator instructs the MFP 100 to print a printing position adjustment chart (recording position adjustment chart) via the display unit 15. The MFP 100 received a print instruction prints and outputs the printing position adjustment chart on a print medium by the printing recording mechanism 12.

In step S102, the operator places the printing position adjustment chart output by the printing recording mechanism 12 on a platen of the reading mechanism 7 according to an instruction from the operation unit 14. After placing the printing position adjustment chart, the operator instructs the MFP 100 to read the printing position adjustment chart via the display unit 15.

In step S103, the MFP 100 controls the reading control unit 6 to cause the reading mechanism 7 to read the printing position adjustment chart. The read image data is stored in the reading buffer memory 8 of the data memory 5. In parallel with the reading operation, the image data stored in the reading buffer memory 8 is subjected to image processing by the data conversion unit 9 and stored in the image memory. In the present exemplary embodiment, in order to reduce an influence of interferences due to a difference between printing resolution and reading resolution and to reduce a memory capacity of the image data, the following reading is performed. The reading mechanism 7 performs the reading operation at an 8-bit gray scale, 600 dpi, and γ 1.0, and stores the image data in the reading buffer memory 8. The data conversion unit 9 performs reduced magnification processing by bicubic interpolation for the stored image data to 300 dpi. The reduced image data is stored in the image memory 13.

In step S104, the MFP 100 performs pattern position detection processing for the image data of the printing position adjustment chart stored in the image memory 13. The pattern position detection processing will be described in detail below referring to FIG. 4.

In step S105, the MFP 100 performs pattern analysis based on a result of the pattern position detection in step S104. The pattern analysis is processing for obtaining, based on a pixel value in an area of a predetermined amount from a position of the pattern, an average luminance of the area.

In step S106, the MFP 100 determines a pattern on an optimal printing position based on a result of the pattern analysis in step S105. The pattern of the optimal printing position is a pattern with the lowest average luminance in the pattern analysis in step S105.

In step S107, the MFP 100 sets an adjustment value for printing position adjustment based on printing conditions of the pattern of the optimal printing position determined in step S106.

Figure 3:
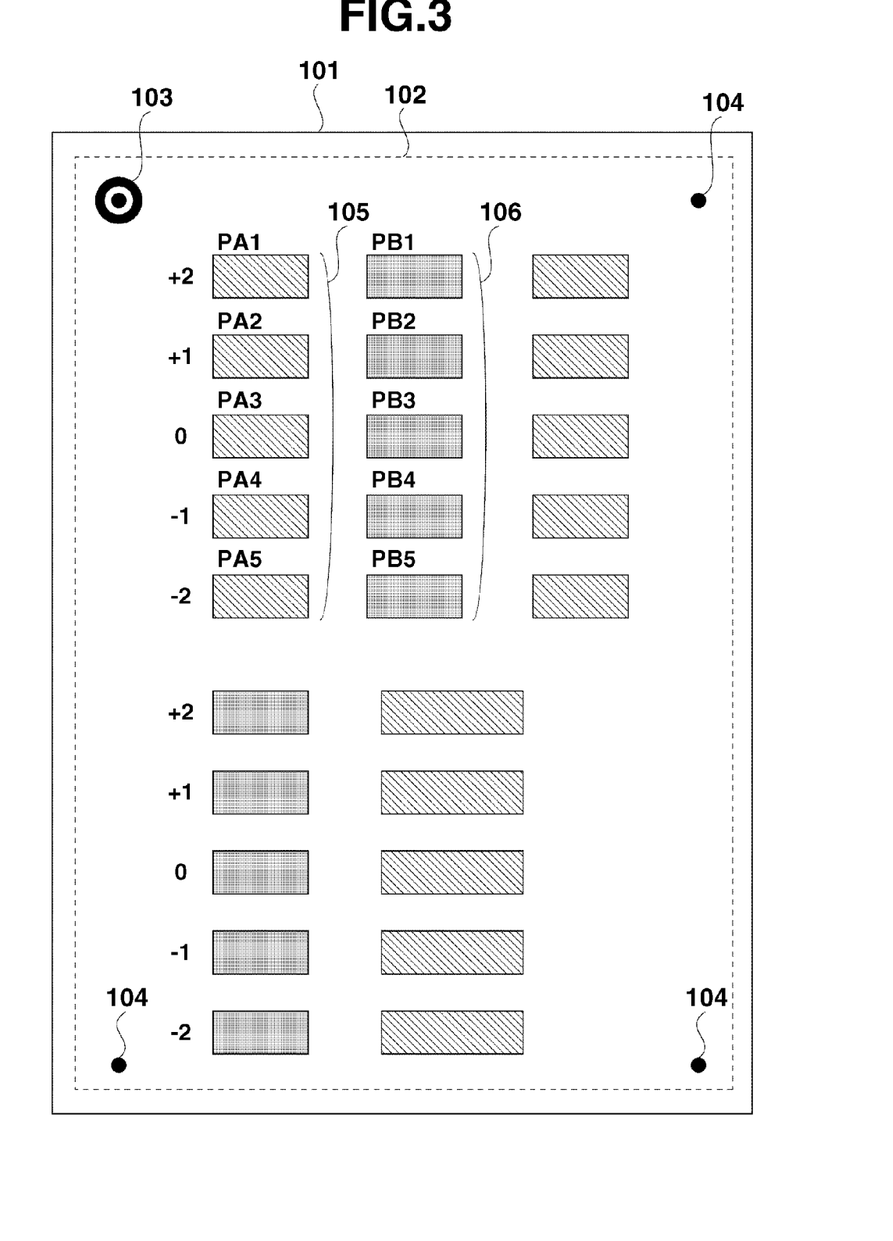
FIG. 3 illustrates a printing position adjustment chart according to the first exemplary embodiment.

FIG. 3 illustrates the printing position adjustment chart printed in step S101 in FIG. 2 according to the present exemplary embodiment. The printing position adjustment chart illustrated in FIG. 3 includes five types of pattern arrays, however the types of pattern arrays do not limit a number of adjustment items. The printing position adjustment chart is printed on a print medium 101. A printing position adjustment chart area 102 printed on the print medium 101 is an area located within a reading range in the reading processing of the printing position adjustment chart in step S103 in FIG. 2.

A reference mark A 103 is a concentric circular mark as illustrated and unchanged in rotation. The reference mark A 103 is set as a reference position of a printing position of each pattern. A reference mark B 104 is a circular mark as illustrated. A position of the reference mark B 104 is referred to in processing for obtaining chart inclination of the image data in FIG. 6 described below. Thus, a center position of the reference mark B 104 on the left upper portion and a center position of the reference mark A 103 are printed to coincide with each other in a horizontal direction.

A printing position adjustment pattern array PA 105 is for between forward printing and backward printing. The pattern array PA is set by shifting a printing position between the forward printing and the backward printing by 1200 dpi. Patterns PA1, PA2, PA3, PA4, and PA5 constituting the pattern array are shifted from each other by +2 dots, +1 dot, 0 dot, −1 dot, and −2 dots. Each pattern printed in the forward printing and a pattern printed in the backward printing is a horizontal striped pattern. When there is a printing positional deviation between the forward printing and the backward printing, an overlapping amount of horizontal stripes changes corresponding to the deviation amount, causing a change in luminance. In the present exemplary embodiment, when there is no printing positional deviation a luminance of the pattern is the lowest and the luminance increases corresponding to a deviation of a printing position.

A printing position adjustment pattern array PB 106 is for between two ink discharge port arrays. The pattern array PB is set by shifting a printing position between the ink discharge port arrays by 1200 dpi. Patterns PB1, PB2, PB3, PB4, and PB5 constituting the pattern array are shifted from each other by +2 dots, +1 dot, 0 dot, −1 dot, and −2 dots. A pattern printed in a first array and a pattern printed in a second array are horizontal striped patterns. When there is a printing positional deviation between the ink discharge port arrays, an overlapping amount of horizontal stripes changes corresponding to the deviation amount, causing a change in luminance. In the present exemplary embodiment, when there is no printing positional deviation a luminance of the pattern is the lowest and the luminance increases corresponding to a deviation of a printing position.

Figure 4:
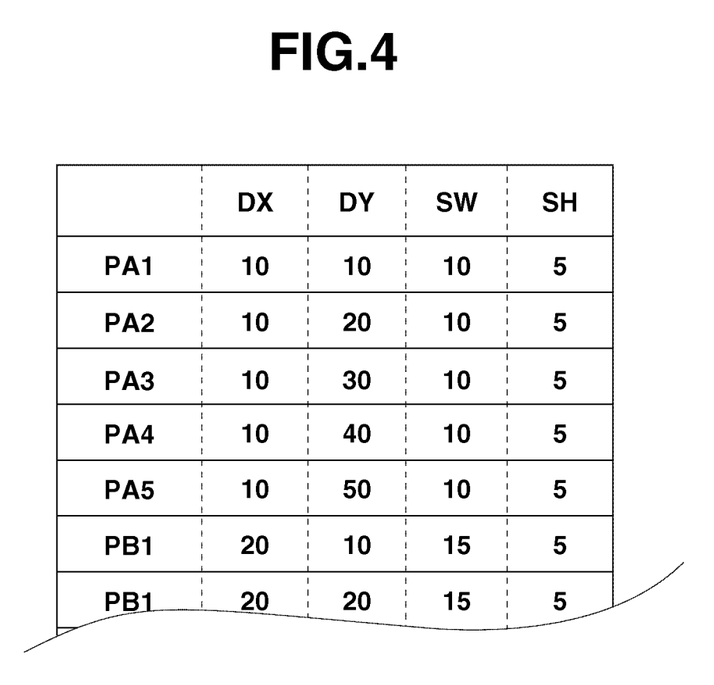
FIG. 4 illustrates another printing position adjustment chart according to the first exemplary embodiment.

FIG. 4 illustrates information about each pattern printing position and a width and a height of each pattern of the printing position adjustment chart printed in step S101 in FIG. 2 according to the present exemplary embodiment. A table in the drawing shows, from a left column, each pattern name, a pattern left upper end position DX from the reference mark A, a pattern left upper end position DY from the reference mark A, a pattern width SW, and a pattern height SH. The information in the drawing is recorded in advance in the program memory 4 of the MFP 100. Each recorded information is referred to in pattern position detection processing described below referring to FIGS. 7A to 7C.

Figure 5:
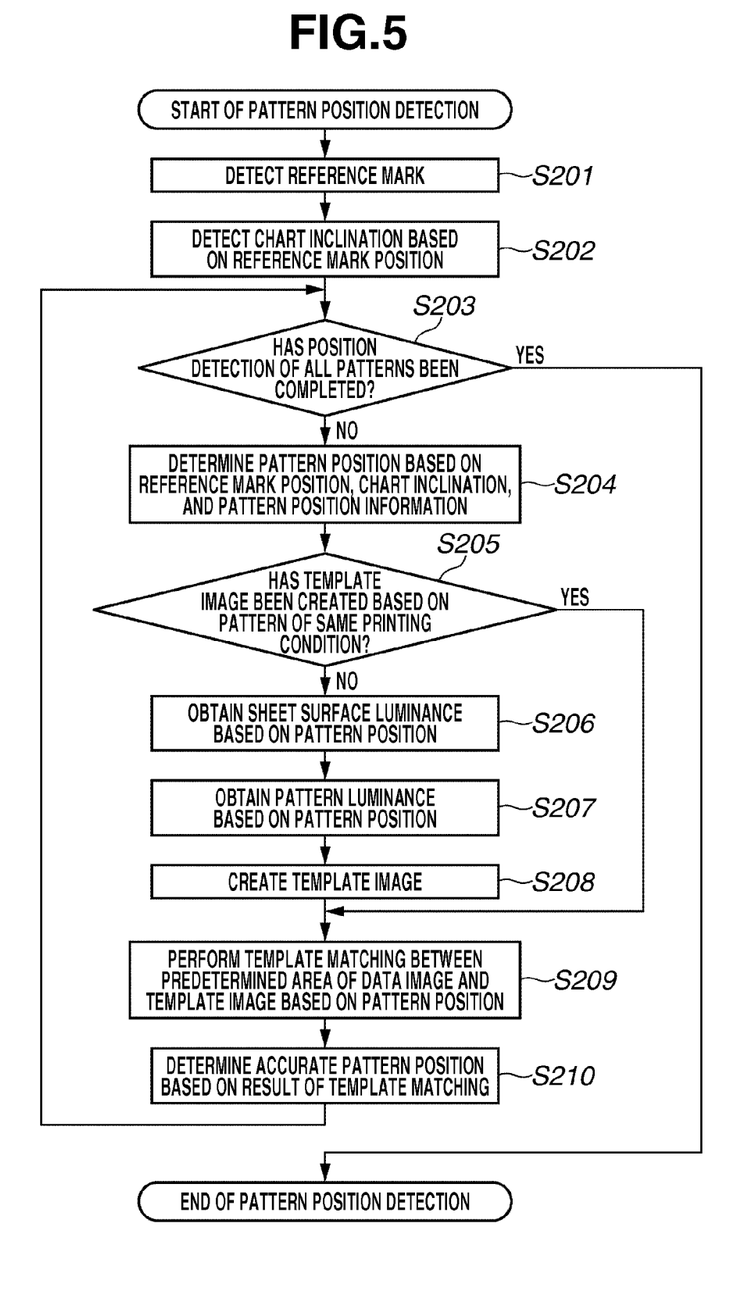
FIG. 5 is a flowchart illustrating a procedure of printing position detection according to the first exemplary embodiment.

FIG. 5 is a flowchart illustrating a procedure for pattern position detection included in the procedure of the printing position adjustment in FIG. 2 according to the present exemplary embodiment.

In step S201, the MFP 100 detects the reference mark A 103 from the image data stored in the image memory 13. The reference mark A 103 is the concentric circular pattern unchanged in rotation, and hence a position thereof can be detected based on pattern matching by one-dimensional raster scanning. The MFP 100 performs binary determination of black and white for each pixel by a predetermined threshold value based on a luminance value, and detects a center position of the reference mark A 103 by determining whether a result of the determination is a pattern of white, black, white, black, white, black, and white with a predetermined width. The MFP 100 can acquire a more accurate position of the reference mark A by obtaining a center of gravity of a density of a predetermined area including the reference mark A 103 based on the position detected based on the pattern matching by the raster scanning.

The MFP 100 detects the reference mark B 104 from the image data stored in the image memory 13. The reference mark B 104 is the circular pattern. The MFP 100 can detect the reference mark B 104 by analyzing a predetermined area based on information about a distance from the reference mark A 103 recorded in the program memory 4. The MFP 100 performs binary determination of black and white for each pixel in the predetermined area by a predetermined threshold value based on a luminance value, and detects a position of the reference mark B 104 by detecting an area of a black pixel having a predetermined area or more. The MFP 100 can acquire a more accurate position by obtaining a center of gravity of a predetermined area including the reference mark B 104.

In step S202, the MFP 100 obtains inclination 201 of the printing position adjustment chart of the image data based on the positions of the reference mark A 103 and the reference mark B 104. Detection processing of the inclination 201 of the chart will be described in detail below referring to FIG. 6. In steps S201 and S202, the CPU 2 functions as a first detection unit to detect a position and inclination of a recording position adjustment chart according to a control program stored in the program memory 4.

In step S203, the MFP 100 determines whether the processing of pattern position detection is completed. The MFP 100 checks whether processing in steps S204 to S210 have been executed for all the patterns. If the MFP determines that the pattern position detection has not been executed for all patterns (NO in step S203), the MFP 100 executes processing in step S204. If it has been executed for all patterns (YES in step S203), the MFP 100 terminates the processing of the pattern position detection.

In step S204, the MFP 100 detects a pattern position based on the position of the reference position mark A 103, the inclination 201 of the chart, and the pattern position information illustrated in FIG. 4. A pattern position (PX, PY) is represented by the following expression (1), where (OX, OY) denotes a position of the reference position mark A, a θ radian denotes inclination of the chart, and (DX, DY) denotes pattern position information of a detection target:

$$PX=(DX*\cos\theta)-(DY*\sin\theta)+OX$$

$$PY=(DX*\sin\theta)+(DY*\cos\theta)+OY \qquad (1)$$

The pattern position (PX, PY) corresponds to a pattern position 302 in FIG. 7A described below. The pattern position (PX, PY) includes a position detection error of the reference position mark A 103 or an error during printing or reading, and hence the pattern position may not coincide with a patch left upper end position of the image data.

In step S205, the MFP 100 determines whether a position of a pattern of the same pattern array as that of the pattern of the position detection target has been detected. This processing is for determining whether to execute template image creation processing in order to detect an accurate pattern position. A template image used for detecting a position of a pattern of the same array has a similar image. If a template image has been created in the same array, a position of the pattern of the same array can be detected using the template image. The use of a single template image for detecting the position of the pattern of the same array can omit processing time of template image creation. If a position of a pattern of the same array is yet to be detected (NO in step S205), the processing proceeds to step S206. If a position of a pattern of the same array has been detected (YES In step S205), the processing proceeds to step S209.

In step S206, the MFP 100 determines a sheet surface area 303 based on the pattern position acquired in step S204, and obtains a sheet surface luminance 403. The processing in step S206 will be described in detail below referring to FIG. 8A.

In step S207, the MFP 100 determines a pattern area 304 based on the pattern position acquired in step S204, and obtains a pattern luminance 404. The processing in step S206 will be described in detail below referring to FIG. 8A.

In step S208, the MFP 100 creates a template image 305 based on the sheet surface luminance 403 and the pattern luminance 404 respectively obtained in steps S206 and S207. The created template image 305 is stored in the image memory 13. The template image creation processing will be described in detail below referring to FIG. 8B.

In step S209, the MFP 100 performs, based on the pattern position acquired in step S204, template matching between a predetermined area 306 of the image data and the template image created in step S208. The processing in step S209 will be described in detail below referring to FIG. 9A.

In step S210, the MFP 100 determines an accurate pattern position based on a result of the template matching acquired in step S209. The processing in step S210 will be described in detail below referring to FIG. 9C.

In steps S208 and S209, the CPU 2 performs, according to the control program stored in the program memory 4, template matching for a predetermined area determined based on the position and the inclination of the recording position adjustment chart. The CPU 2 functions as a second detection unit to determine a pattern position based on a result of the template matching.

Figure 7A:
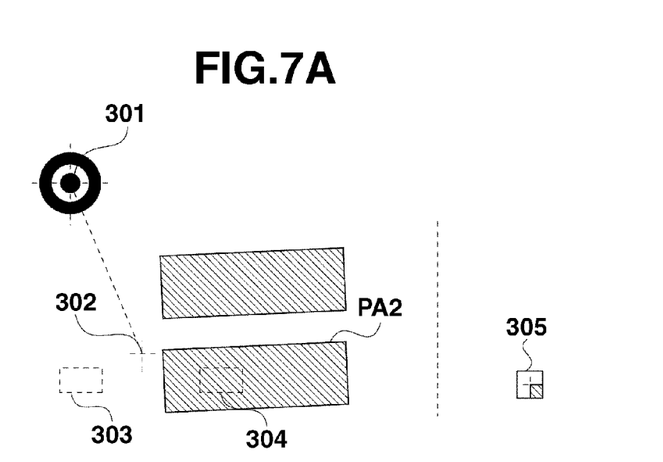
FIGS. 7A to 7C illustrate processing for obtaining a pattern analysis area.
Figure 7B:
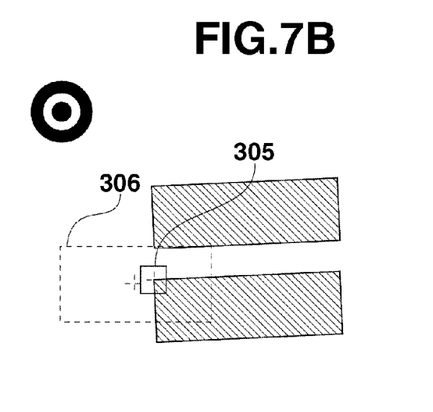
Figure 7C:
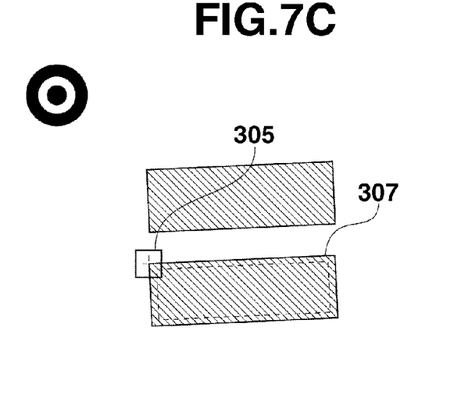

Step S204 and steps S206 to S210 are illustrated in FIGS. 7A to 7C described below.

Figure 6:
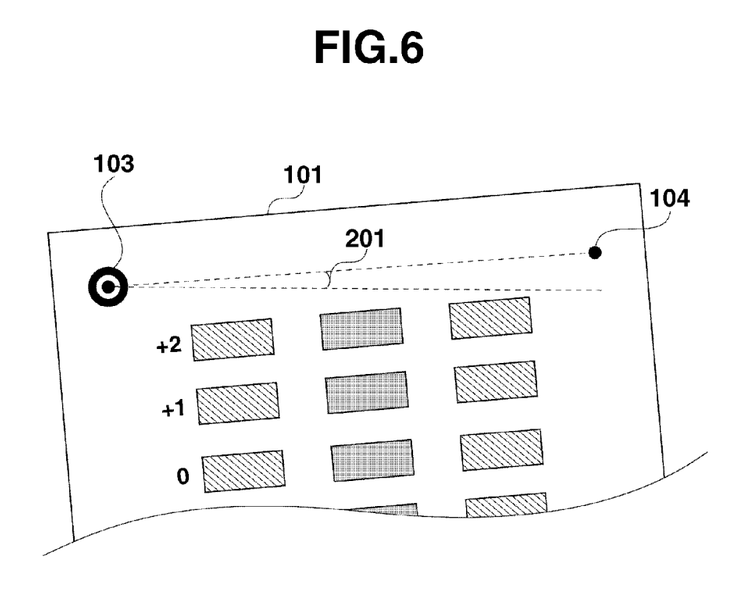
FIG. 6 illustrates processing for obtaining inclination of a printing position adjustment chart.

FIG. 6 illustrates the processing in step S202 in FIG. 5 for obtaining the inclination of the printing position adjustment chart according to the present exemplary embodiment. The processing is based on an assumption that a print medium 101 is placed on the platen and read. The printing position adjustment chart area 102 also inclines when during printing, the print medium 101 is obliquely conveyed and the chart is obliquely printed.

An inclination 201 of the chart is obtained based on the reference mark A 103 and the reference mark B 104. The inclination θ radian of the chart is represented by the following expression (2), where (AX, AY) denotes coordinates of the reference mark A 103 and (BX, BY) denotes coordinates of the reference mark B 104:

$$\theta = \arctan((BY-AY)/(BX-AX)) \quad (2)$$

FIGS. 7A to 7C illustrate the processing in steps S204 to S210 in FIG. 5 according to the present exemplary embodiment. The processing will be described by taking an example of pattern position detection of the pattern PA2. FIG. 7A illustrates a position 301 of the reference mark A acquired in step S201 in FIG. 2, and a pattern position 302 acquired in step S204 in FIG. 2. As illustrated in FIG. 5, the pattern position 302 includes a position detection error of the reference position mark A 103 and an error during printing or reading, and hence the position 302 may not coincide with the patch left upper end position of the image data.

Further, FIG. 7A illustrates a sheet surface area 303 for obtaining a sheet surface luminance determined based on the pattern position 302 in step S206 in FIG. 2, a pattern area 304 for obtaining a pattern luminance determined based on the pattern position 302 in step S207 in FIG. 2, and a template image 305 created in step S208 in FIG. 2. Creation processing of the template image 305 will be described in detail below referring to FIGS. 8A and 8B.

FIG. 7B illustrates a searching range 306 of the template matching determined based on the pattern position in step S209 in FIG. 2. FIG. 7C illustrates a pattern analysis area 307 acquired based on the accurate pattern position recorded in step S210 in FIG. 2.

Figure 8A:
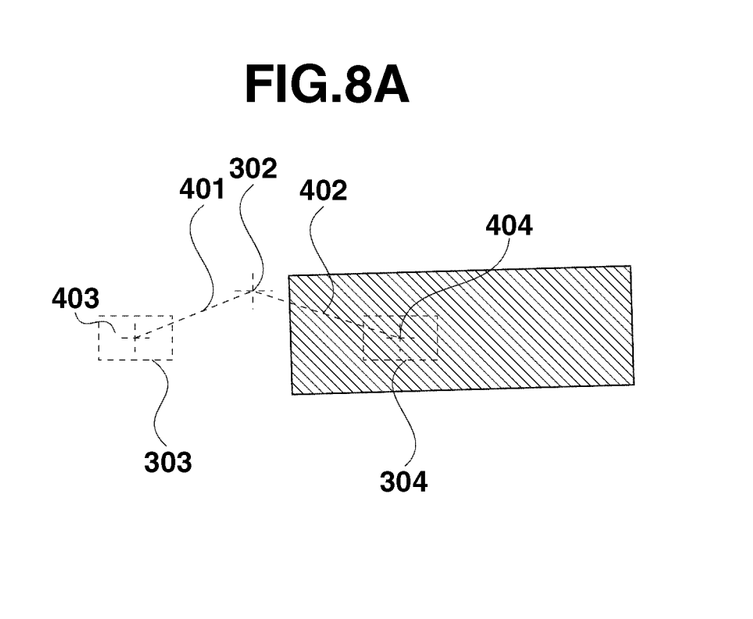
FIGS. 8A and 8B illustrate processing for obtaining a sheet surface luminance and a pattern luminance.
Figure 8B:
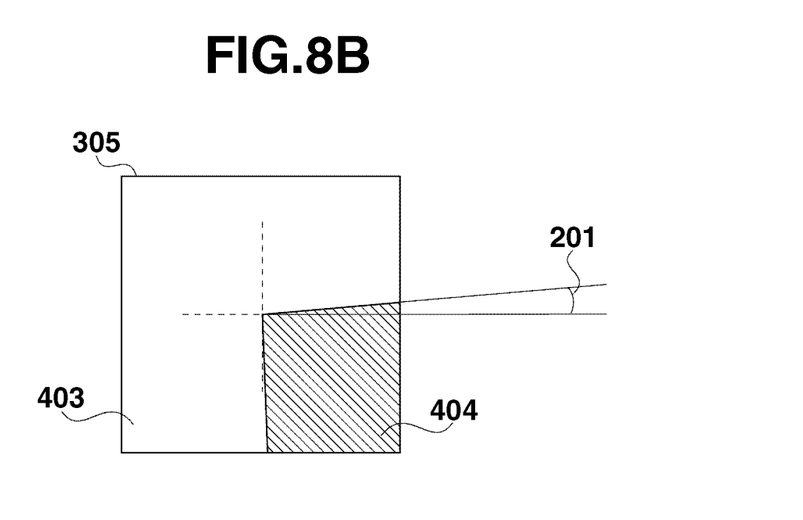

FIGS. 8A and 8B illustrate the processing in steps S206 and S207 and the processing in step S208 in FIG. 5 according to the present exemplary embodiment. FIG. 8A illustrates the processing in steps S206 and S207 in FIG. 5. A sheet surface luminance 403 is obtained by averaging pixel values in the sheet surface area 303 for obtaining a sheet surface luminance determined based on an offset 401 from a pattern position of a sheet surface luminance acquisition area stored in advance from the pattern position 302. FIG. 8A illustrates a pattern luminance 404. The pattern position 302 includes an error as described above referring to FIG. 5, and hence the offset 401 from the pattern position of the sheet surface acquisition area and the sheet surface area 303 for obtaining a sheet surface luminance take values based on the error. Thus, the sheet surface area 303 for obtaining the sheet surface luminance is included in the sheet surface area.

The pattern luminance 404 is obtained by averaging pixel values in the pattern area 304 for obtaining the pattern luminance determined based on the offset 402 from the pattern position of the pattern luminance acquisition area stored in advance from the pattern position 302. The offset 402 from the pattern position of the pattern luminance acquisition area and the pattern area 304 for obtaining the pattern luminance take values based on the error of the pattern position 302. Thus, the pattern area 304 for obtaining the pattern luminance is included in the pattern area.

FIG. 8B illustrates processing for creating a template image 305 based on the sheet surface luminance and the pattern luminance obtained in FIG. 8A. The template image 305 is divided into four upper, lower, left and right areas from an image center in order to detect a left upper end position of a pattern. A pixel value of the lower left area of the four divided areas is set to a pattern luminance 404. A pixel value of each of the other areas is set to a sheet surface luminance 403. If there is inclination 201 of the chart, as illustrated, inclination of an amount equal to that of the inclination 201 of the chart is added with a left upper end of the area of the pattern luminance set as a rotational center to create a template image 305.

Figure 9A:
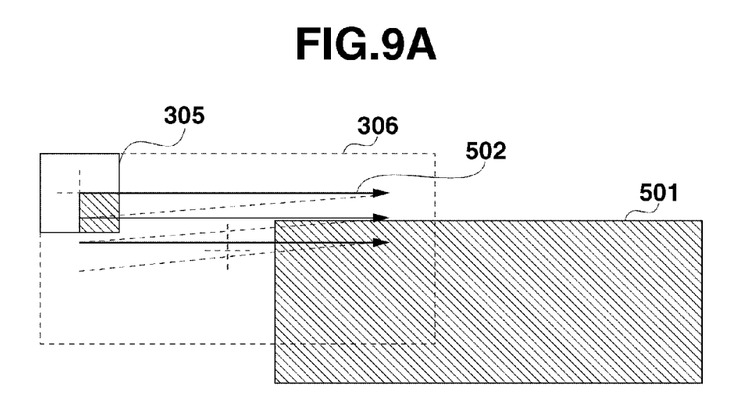
FIGS. 9A and 9B illustrate template matching processing.
Figure 9B:
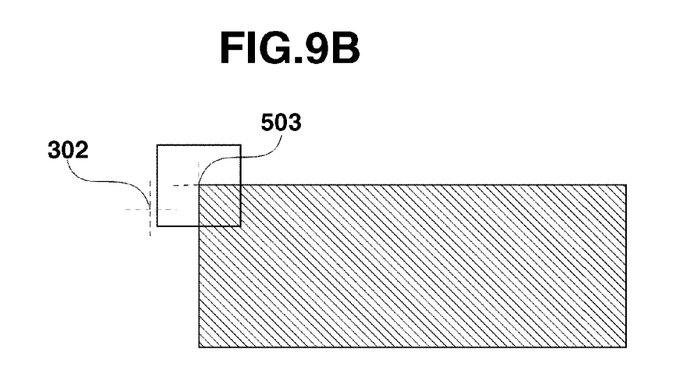

FIGS. 9A and 9B illustrate the template matching processing in step S209 in FIG. 5 according to the present exemplary embodiment. FIG. 9A illustrates processing for acquiring a difference by raster-scanning the template image with respect to a searching range 306 of the predetermined area of the image data. A pattern 501 is a target pattern for pattern position detection. The template image 305 is moved in a direction 502 during the raster scanning.

In the present exemplary embodiment, a sum of squared difference (SSD) is used as a template matching method. The SSD is represented by the following expression (3), where M*N denotes a size of a template image, T (i, j) denotes a pixel value in a template position (i, j), and I (i, j) denotes a pixel value of image data superimposed on the template image.

[Math. 1]

$$R = \sum_{j=0}^{N-1} \sum_{i=0}^{M-1} (I(i, j) - T(i, j))^2 \quad (3)$$

FIG. 9B illustrates a position where a difference R obtained by the expression (3) in FIG. 9A is smallest, more specifically, a position where the template image 305 within the searching range 306 is most similar. The template image includes a pattern left upper end portion 503. The pattern left upper end portion 503 of the template image is located in the left upper end portion of the target pattern for pattern position detection. Thus, an accurate pattern position can be acquired based on the position where the difference R is smallest and the pattern left upper end portion 503 of the template image.

In the present exemplary embodiment, the template matching based on the SSD has been described. However, a template matching method of pattern position detection is not limited to the SSD. Other template matching methods such as a sum of absolute differences (SAD) and a normalized cross-correlation (NCC) may be used.

As apparent from the above descriptions, in pattern position detection of image data, highly accurate and highly robust position detection can be performed within a short period of time without obtaining any feature amount of an image to create an abstract pattern. Further, pattern matching can be performed without preparing any template image for pattern matching.

The object of the present invention of enabling highly accurate pattern position detection within a short calculation period of time can be achieved as long as a recording position adjustment value is determined based on image data read by the reading unit such as a scanner unit. Thus, an image processing apparatus to which the present invention can be applied may be, in addition to the multifunction recording apparatus including the printing unit and the scanner unit, an external device connected to the recording apparatus via an external interface (I/F). The above described processing can be performed by both of the recording apparatus and the external device. In this case, an image processing system including the recording apparatus and the external device achieves the object of the present invention.

The object of the present invention can also be achieved by the following manner. More specifically, a storage medium recording a program code of software for realizing the above described function is supplied to a system or an apparatus, and a computer of the system or the apparatus reads the program code stored in the storage medium to execute the program code. In this case, the program code read from the storage medium itself realizes a novel function of the present invention, and the storage medium storing the program code is within the present invention. As the storage medium for supplying the program code, for example, a flexible disk, a hard disk, an optical disk, a magneto-optical disk, a compact disk read-only memory (CD-ROM), a compact disk readable (CD-R), a magnetic tape, a nonvolatile memory card, or a ROM can be used. The function of the exemplary embodiment can be realized by executing the read program code via the computer. An operating system (OS) operating on the computer performs apart or all parts of actual processing based on an instruction of the program code, and the function of the exemplary embodiment can be achieved by the processing.

In the exemplary embodiment, the scanner unit reads the luminance of the recording position adjustment pattern to adjust the recording position. However, the recording position may be adjusted based on another optical information such as a reflection optical density OD.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
an obtaining unit configured to obtain an image of a chart, including a pattern, read by a reading unit, the chart being recorded on a recording medium;
a creating unit configured to create a template image for template matching used for detecting a position of the pattern in the chart, the template image being created using a portion of the image of the chart obtained by the obtaining unit;
a position detection unit configured to detect the position of the pattern in the chart based on the image of the chart obtained by the obtaining unit by template matching using the template image created by the creating unit; and
an acquiring unit configured to acquire information of the pattern of which the position in the chart is detected by the position detection unit.

2. The apparatus according to claim 1, wherein the position detection unit detects the position of the pattern according to a correlation between an image in a predetermined area and the template image.

3. The apparatus according to claim 1, further comprising the reading unit and a recording unit for recording an image on a recording medium using a recording head which discharges ink.

4. The apparatus according to claim 1, further comprising:
an inclination detection unit configured to detect an inclination of the chart from a regular position, wherein the position detection unit determines an area for obtaining a luminance of the recording medium and determines a pixel value used for creating the template image based on the inclination of the chart detected by the inclination detection unit.

5. The apparatus according to claim 4, wherein the chart includes a plurality of patterns.

6. The apparatus according to claim 4, wherein a pixel value of an image corresponding to the recording medium in the template image is obtained from an average of pixel values of an area for obtaining the pixel value of the recording medium and a pixel value of an image corresponding to the pattern in the template image is obtained from an average of pixel values of an area for obtaining the pixel value of the pattern.

7. The apparatus according to claim 1, wherein the pattern is used for adjusting a recording by a recording unit on a print medium, and further comprising an adjusting unit configured to adjust the recording by the recording unit on a print medium based on the information acquired by the acquiring unit.

8. The apparatus according to claim 7, wherein the recording unit is a recording head ejecting ink and the pattern is recorded by the recording head for adjusting a recording position on the recording medium by the recording head, and the adjusting unit adjusts the recording position based on the information acquired by the acquiring unit.

9. A method comprising:
obtaining an image of a chart, including a pattern, read by a reading unit, the chart being recorded on a recording medium;
creating a template image for template matching used for detecting a position of the pattern in the chart, the template image being created using a portion of the image of the chart obtained in the obtaining step;
detecting the position of the pattern in the chart based on the image of the chart obtained in the obtaining step by template matching using the template image created in the creating step; and
acquiring information of the pattern of which the position in the chart is detected in the detecting step.

10. A non-transitory computer-readable storage medium storing a program for causing a computer to execute a method comprising:
obtaining an image of a chart, including a pattern, read by a reading unit, the chart being recorded on a recording medium;
creating a template image for template matching used for detecting a position of the pattern in the chart, the template image being created using a portion of the image of the chart obtained in the obtaining step;
detecting the position of the pattern in the chart based on the image of the chart obtained in the obtaining step by template matching using the template image created in the creating step; and
acquiring information of the pattern of which the position in the chart is detected in the detecting step.

11. An apparatus comprising:
an obtaining unit configured to obtain data of an image including a pattern;
a creating unit configured to create a template image for template matching used for detecting a position of the pattern in the image, the template image being created using the data of a portion of the image obtained by the obtaining unit;
a position detection unit configured to detect the position of the pattern in the image based on the data of the image obtained by the obtaining unit by template matching using the template image created by the creating unit; and
an acquiring unit configured to acquire information of the pattern of which the position in the image is detected by the position detection unit.

12. An apparatus comprising:
an obtaining unit configured to obtain data of an image area including a particular image;
a creating unit configured to create a template image for template matching used for detecting a position of the particular image in the image area, the template image being created using the data of a portion of the image area obtained by the obtaining unit;
a position detection unit configured to detect the position of the particular image in the image area based on the data of the image area obtained by the obtaining unit by template matching using the template image created by the creating unit; and
an acquiring unit configured to acquire information of the particular image of which the position in the image area is detected by the position detection unit.

13. The apparatus according to claim 1, wherein the creating unit determines an image portion at a predetermined position in the chart as the portion of the image of the chart used for creating the template image.

14. The apparatus according to claim 1, wherein the template image is created using a portion corresponding to the pattern of the image of the chart obtained by the obtaining unit.

* * * * *